United States Patent [19]  [11] 3,876,528
Heilman et al. [45] Apr. 8, 1975

[54] PROCESS FOR CONDITIONING A HYDROTREATED LUBRICATING OIL BASE STOCK

[75] Inventors: William J. Heilman, Allison Park; Thomas J. Lynch, Harmar Township, both of Pa.

[73] Assignee: Gulf Research & Development Company, Pittsburgh, Pa.

[22] Filed: June 12, 1974

[21] Appl. No.: 478,787

Related U.S. Application Data

[63] Continuation-in-part of Ser. No. 205,720, Dec. 7, 1971, abandoned.

[52] U.S. Cl. .................. 208/143; 208/57; 208/144; 252/59; 260/93.7; 260/683.15 D
[51] Int. Cl. .......................................... C10g 39/00
[58] Field of Search ............ 208/57, 143, 264, 144; 260/683. 9

[56] References Cited
UNITED STATES PATENTS

| | | | |
|---|---|---|---|
| 2,956,013 | 10/1960 | Geiser et al. | 208/212 |
| 2,963,520 | 12/1960 | Neal | 260/676 |
| 3,392,112 | 7/1968 | Bercik et al. | 208/143 |
| 3,459,656 | 8/1969 | Rausch | 208/143 |
| 3,737,477 | 6/1973 | Stearns et al. | 260/683.9 |
| 3,758,614 | 9/1973 | Mertzweiller et al. | 208/143 |
| 3,770,844 | 11/1973 | Mertzweiller et al. | 208/143 |

*Primary Examiner*—Herbert Levine

[57] ABSTRACT

A process for conditioning hydrotreated lubricating oil base stock by treating the base stock in the presence of hydrogen and a Ziegler-Natta type catalyst. The resulting conditioned oil is a stable reaction medium for the Ziegler-Natta polymerization of alpha-olefins.

7 Claims, No Drawings

PROCESS FOR CONDITIONING A HYDROTREATED LUBRICATING OIL BASE STOCK

This patent application is a continuation-in-part of our U.S. patent application Ser. No. 205,720, filed Dec. 7, 1971 now abandoned.

This invention relates to the conditioning of hydrotreated lubricating oil base stock by treating the lube oil base stock in the presence of hydrogen and a Ziegler-Natta type catalyst. This conditioned, hydrotreated lubricating oil base stock can be used as a reaction medium for the Ziegler-Natta polymerization of alpha-olefins to polymers of substantially uniform, desirable molecular weight characteristics.

A lubricating oil base stock is prepared from a lubricating oil cut taken from a vacuum distillation column by removing undesirable constituents in a lubricating oil refinery. Since the crude oil feed stocks used in the various oil refineries exhibit a substantial variety of compositions and characteristics depending on the source of the crude, variations in lube oil refining procedures are employed in the lube oil refineries to remove the different undesirable constituents and produce the desired lube oil base stock. Lube oil hydrotreating, a specific process of well defined conditions and catalyst, is frequently used as a final purification step in lube oil refining for the substantial removal of oxygen, nitrogen and sulfur impurities in the lube oil as well as the substantial elimination of aromatic structures. Lube oil hydrotreating is defined as a process carried out at a temperature of 280° to 340° C., a hydrogen partial pressure of 40–70 kg/cm$^2$, and a feed to catalyst volume ratio of 0.5:1 to 1:1 per hour over a Group VIB and VIII catalyst such as a cobalt molybdate on alumina catalyst. These highly refined, hydrotreated lubricating oil base stocks, although derived from different crude oils, are substantially equivalent in their characteristics at a specified viscosity and in the structural types forming the composition as a result of the various rigorous purification procedures to which they are subjected.

Various additives are incorporated into automotive-type lubricating oils to improve the oils' in-use properties. Alpha-olefin polymers of controlled molecular weight characteristics and narrow molecular weight distribution are shear stable additives which are useful for the preparation of multiviscosity graded motor oils. These alpha-olefin polymers can be made with consistent uniformity in a volatile reaction medium, such as heptane, from which the polymer must be separated for use in the motor oil. It would be advantageous to produce the poly(1-olefin) additive in a lubricating oil as the reaction medium and polymer solvent since the oil solution of the product polymer could be used as a polymer-in-oil concentrate for direct incorporation into the motor oil for viscosity improvement without prior separation of the reaction medium. However, when a conventional lubricating oil base stock is used as the reaction medium, the polymerization reaction is erratic. Sometimes, no polymer product is obtained from the polymerization reaction and when polymer product is obtained, it is variable and of undesired molecular weight characteristics for use as a motor oil additive. The apparent explanation for this erratic behavior is the presence of residual impurities in the conventional lube oil base stock. Surprisingly, we discovered that the alpha-olefin polymerization reaction is also erratic with resulting poor molecular weight characteristics in the polymer obtained in a polymerization reaction when a highly purified, hydrotreated lube oil base stock is used as the reaction medium for the polymerization.

We have now discovered that a hydrotreated lubricating oil base stock can be stabilized into a highly useful Ziegler-Natta polymerization reaction medium by subjecting it to hydrogen treatment in the presence of a Ziegler-Natta type catalyst prior to the use of the oil in the polymerization reaction. The subsequent use of this conditioned hydrotreated lubricating oil base stock in the polymerization of alpha-olefins results in a reproducible reaction to polymer products which are substantially the same in molecular size and molecular weight distribution as those produced in heptane at similar conditions. Hydrotreated lubricating oil base stock together with hydrogen and the Ziegler-Natta catalyst can be conditioned by the process of our invention and then used immediately as the reaction medium for the polymerization of alpha-olefins or the conditioned hydrotreated lubricating oil base stock can be stored for later use. One of the most surprising features of our discovery is that a conventional non-hydrotreated lubricating oil base stock cannot be successfully conditioned by hydrogen treatment in the presence of a Ziegler-Natta type catalyst. Therefore, for successful conditioning the procedure requires a lube oil base stock which has been previously hydrotreated. Why this double hydrogenation treatment over different catalysts is required to convert the oil to a suitable reaction medium or what changes the second, conditioning treatment effects on the hydrotreated oil, we do not understand. This uncertainty is particularly emphasized by the knowledge that hydrotreated lubricating oil base stocks have already been hydrogen-treated for the removal of impurities and the knowledge that Ziegler-Natta catalysts as used in the conditioning treatment are not conventionally viewed as hydrogenation catalysts.

A significant advantage of the present invention is that the conditioned, hydrotreated lubricating oil base stock can be used as a reaction medium for the polymerization of an alpha-olefin and can then be incorporated together with the polymer in the ulitmate product, such as a finished motor oil or an oil-extended rubber, thereby avoiding the need to separate the polymerization solvent from the poly(1-olefin). As described, the lubricating oil base stock will have been refined in a lube oil refinery and will have been hydrotreated. This hydrotreated lubricating oil base stock can suitably have a viscosity at 210° F. (98.9° C.) by ASTM D 445 within the range of about 2.0 cs. to about 8.0 cs. for use as an alpha-olefin polymerization reaction medium and preferably within the range of about 3.0 cs. to about 5.0 cs. at 210° F.

The catalyst which can be used in conditioning the hydrotreated lubricating oil base stock is any Ziegler-Natta type catalyst. If the polymerization reaction is to be carried out immediately following the oil conditioning procedure, it is preferred to use a Ziegler-Natta type of catalyst for the conditioning which will also be useful in the subsequent polymerization of the alpha-olefin to a polymer possessing the desired molecular weight characteristics. By using the same Ziegler-Natta type catalyst in both steps, a catalyst separation step is eliminated prior to the polymerization step.

As used herein, Ziegler-Natta catalyst and Ziegler-Natta type catalyst are used interchangeably and are synonymous with the expressions Ziegler catalyst or Ziegler type catalyst. These expressions are in general use in the art to refer to catalysts which are adapted for the low pressure polymerization of ethylenically unsaturated monomers. The catalyst is generally defined as a mixture or reaction product of a compound of a transition metal in a valence state less than its maximum valence state and an organometallic compound of Groups II and III of the Periodic Table. The transition metal can be from Groups IV-B, V-B, VI-B and VIII (pages 392 and 393, HANDBOOK OF CHEMISTRY AND PHYSICS, 36th Ed.). Titanium tetrachloride and tetrabromide, vanadium tetrachloride, and zirconium tetrachloride and acetylacetonate are readily reduced to a lower valence state. The metal halides are preferred and the chlorides are most preferred. The organometallic compound will have at least one hydrocarbon radical, preferably a lower alkyl radical having one to four carbon atoms or phenyl with the other groups optionally being hydrocarbon, halogen, alkoxy, hydrogen and the like. Aluminum, magnesium and zinc compounds are most common, such as trimethyl aluminum, triethyl aluminum, triisobutyl aluminum, dialkyl zinc, dialkyl magnesium, alkyl aluminum sesquihalide, dialkyl aluminum chloride or bromide, dialkyl aluminum hydride, alkyl zinc chloride, alkyl magnesium chloride, and the like. In a Ziegler-Natta type catalyst the gram atoms of the Group II or Group III metal are generally at least about equal to the gram atoms of the transition metal.

The poly(1-olefin) prepared in the conditional hydrotreated lubricating oil base stock will be either soluble or insoluble in this oil reaction medium depending on the nature of the olefin feed, the Ziegler-Natta catalyst used, the polymerization conditions, and the like. The soluble polymer product is preferred since the polymer product and mineral oil solution can then be directly used without separation. A Ziegler-Natta catalyst which is useful for the polymerization of propylene is generally useful for preparing a poly(1-olefin), which is soluble in the conditioned hydrotreated lubricating oil base stock. The six to 12 carbon olefins generally consistently produce an oil soluble polymer with any Ziegler-Natta type catalyst. More broadly the olefins that can advantageously be polymerized in the conditioned, hydrotreated lube oil base stock include alpha-olefins having from two to 20 carbon atoms, and mixtures of these alpha-olefins.

The hydrotreated lubricating oil base stock conditioning step of this invention is carried out in the presence of hydrogen for sufficient time to properly condition the mineral oil so that it is satisfactory as a reaction medium and solvent for the consistent preparation of poly(1-olefins) of the desired molecular weight characteristics. The time for the conditioning step will vary somewhat depending on the temperature, hydrogen pressure and the proportions of the components present in the reactor and also depending to some extent on the specific Ziegler-Natta catalyst that is used. The reaction time for the conditioning treatment can vary from a few seconds, such as about 30 seconds, up to about an hour depending on the oil that is being conditioned and other factors. The reaction time most usually lies within the range of about 5 to about 15 minutes. The hydrogen partial pressure in the oil conditioning treatment can be from about one psia. to about 150 psia. or higher, but it is preferred that a hydrogen pressure be used in the range of about one to about 50 psia. Excessive treatment time and pressure, although not harmful, are generally avoided as being of no particular advantage.

The temperature at which the conditioning of the hydrotreated lube oil base stock can be successfully carried out is not critical. A temperature from about −10° C. to about 125° C. can be conveniently used, and preferably about 30° to about 125° C. The concentration of the Ziegler-Natta type catalyst that is used in the oil conditioning can vary from about 0.01 to about 20 grams of catalyst per liter of oil and preferably from about 0.05 to about 10.0 grams of catalyst per liter of oil.

When a batch alpha-olefin polymerization reaction under hydrogen is to be carried out in a lube oil conditioned by the present invention, the conditioning of the lube oil can be conveniently accomplished in the polymerization reactor at the hydrogen pressure used during polymerization and in the presence of the Ziegler-Natta type polymerization catalyst prior to the introduction of the alpha-olefin. An alternative procedure utilizes an elongated tube reactor in which the hydrotreated lubricating oil base stock and the Ziegler-Natta type polymerization catalyst are introduced into the elongated tube reactor under hydrogen pressure with the alpha-olefin introduced downstream into the elongated tube reactor after the hydrotreated lube oil base stock has been stabilized by the conditioning procedure. The conditioning of the hydrotreated lube oil base stock as a reaction medium for the polymerization of alpha-olefins does not take place in the substantial presence of an alpha-olefin. Instead conditioning treatment must be carried out before a significant amount of the alpha-olefin is introduced into the reactor.

There are many advantages to the above-described lube oil conditioning process. First, by stabilizing or conditioning the hydrotreated lube oil base stock in accordance with the herein-described procedures, the oil can be successfully used as a general reaction medium and solvent in the Ziegler-Natta catalytic polymerization of alpha-olefins with consistent and uniform results. Polyalpha-olefins having a molecular weight distribution less than about 12 and if desired, less than about six can be consistently produced in the conditioned oil reaction medium. Alpha-olefin polymers can be prepared in this conditioned lube oil reaction medium that are useful as shear stable, viscosity improving additives for automotive-type lubricating oils with the same uniformity and consistency in results as alpha-olefin polymers that are prepared in lighter solvents such as n-heptane. We have determined that desirable multiviscosity graded oils are obtained when the alpha-olefin polymer additive possesses a weight average molecular weight between 50,000 and 1,000,000; a number average molecular weight between 4,000 and 1,000,000 and a maximum molecular weight distribution of about 12 when the weight average molecular weight is 50,000 and a maximum molecular weight distribution of about two when the weight average molecular weight is 1,000,000. These conditioned lube oil solvents can also be used with a Ziegler-Natta type catalyst in the copolymerization of ethylene and propylene to produce ethylene-propylene rubbers or with higher alpha-olefins to produce rubbers of these higher alpha-olefins. In these polymerizations to form rubbers, the product polymers are produced with consistent specification as solutions in the mineral oil reaction medium, and can then be directly used, without separating the mineral oil, in the preparation of oil-extended rubbers.

When the alpha-olefin polymer is used in preparing a shear stable, multiviscosity grade lubricating oil, the Ziegler-Natta catalyst must be capable of forming a polymer which is soluble in mineral oil since an insoluble polymer would be a useless lube oil additive. Particularly useful are titanium and vanadium salts, primarily the chlorides, in conjunction with aluminum alkyls and alkyl chlorides. Purple titanium trichloride together with aluminum triethyl are particularly desirable for polymerizations involving the higher alpha-olefins beginning with 1-pentene. On the other hand a mixture of vanadium oxychloride and ethyl aluminum sesquichloride (Ethyl$_3$Al$_2$Cl$_3$) is particularly desirable for the polymerization of a mixture of olefins having less than five carbon atoms to produce an oil soluble polymer. A catalyst containing from about one to about 10 gram atoms of the Group II or Group III metal such as aluminum per gram atom of titanium or vanadium or other Group IVA, VA or VIA metal is particularly useful, with a ratio of about 1.8 to about 3 being preferred.

The polymerization reaction is suitably carried out using about 2.5 to about 80 mols of olefin per gram of catalyst and preferably from about 15 to about 40 mols of olefin per gram of catalyst. In the polymerization reaction the mineral oil solvent can suitably be from about 10 to about 75 weight percent of the total amount of the mineral oil plus olefin and preferably from about 30 to about 65 percent. The temperature can suitably be between about 35° C. and about 125° C. and preferably between about 100° C. and about 125° C. When used, the hydrogen partial pressure can suitably be between about 0.1 and about 150 psia. and preferably between about 0.5 and about 25 psia.

The hydrotreated lubricating oil base stock is pretreated or conditioned hereunder preferably by using the same catalyst, the same amount of catalyst, the same temperature, the same hydrogen pressure, and the same ratio of Group II or Group III metal such as aluminum to Group IVA, VA or VIA metal as will be used in the following polymerization. For example, the ratio of gram atoms aluminum to gram atoms Group IVA, VA, or VIA metal can be from about 1:1 to about 10:1 and preferably from about 1.8:1 to about 3:1. However, as little as one percent of the amount of catalyst can be used for conditioning the lube oil as is used for the polymerization reaction with the remaining amount that is required for polymerization being added subsequent to the pretreating step.

The polymerization can be successfully carried out in the presence of a suitable chain termination or chain transfer material such as hydrogen, diethyl zinc and the like, or the polymerization can be carried out, if desired, without using any such material. The product polymer can be produced in the pretreated mineral oil with consistent results and with a consistently narrow molecular weight distribution whether or not a chain termination or chain transfer agent is used. The chain terminator, such as hydrogen, primarily effectuates a lowering of polymer molecular weight.

The following examples are set out to illustrate the novel process of the invention and to provide a better understanding of its details and advantages. A hydrotreated lubricating oil base stock having a viscosity of 4.1 cs. at 210° F. was used except where indicated. The oil from Grand Bay Ordovician crude was solvent extracted, dewaxed and hydrotreated. It is classified in the trade as a light neutral oil. The oil before use in the following examples contained less than one p.p.m. water and free oxygen unless otherwise stated.

EXAMPLE 1

A dewaxed, solvent treated mineral lubricating oil base stock having a 210° F. viscosity of 3.22 cs. was conditioned in a 30 gallon stirred reactor. This lube oil base stock had not been hydrotreated. A hydrogen pressure of 17 psig. was maintained in the reactor over 80.3 pounds of the non-hydrotreated lube oil base stock and 580 grams of a 6 percent solution of triethyl aluminum in a 22 to 28 carbon alpha-olefin wax and 36.5 grams of (TiCl$_3$)$_3$·AlCl$_3$ were added to the reactor. The solution was heated from 120° to 240° F. over a 10-minute period to condition the oil. The hydrogen pressure and 240° F. temperature were maintained in the reactor as 126.8 pounds of a solution containing 91 mol percent 1-hexene and 9 mol percent 1-octadecene was pumped into the reactor over a 90 minute period. The contents of the reactor were stirred at the same temperature and hydrogen pressure until they became too viscous to stir. No analysis could be performed on the resulting polymer because of its very high viscosity.

EXAMPLE 2

The conditioning step of Example 1 was repeated at a higher hydrogen pressure of 22 psig. after increasing the amount of triethyl aluminum solution to 1,300 grams. Following this 122.2 pounds of the solution of 1-hexene and 1-octadecene was added over a 1.5 hour period as the temperature of 240° F. and hydrogen pressure of 22 psig. was maintained. Stirring was continued for 2 hours at 240° F. No polymer was obtained.

These two examples indicate that a non-hydrotreated lubricating oil base stock cannot be successfully conditioned hereunder for use as an alpha-olefin polymerization solvent. The next four examples show that a hydrotreated lubricating oil base stock is not successfully conditioned hereunder without hydrogen.

EXAMPLE 3

The preparation of a high molecular weight poly(1-hexene) was attempted in a 30-gallon stirred reactor without hydrogen pretreatment of the 4.1 cs. hydrotreated lubricating oil base stock. While a nitrogen blanket was maintained in the reactor, 65.2 pounds of light neutral oil, 0.58 pound of triethyl aluminum and 0.61 pound of (TiCl$_3$)$_3$·AlCl$_3$ were added to the reactor. The reactor was heated to 240° F. under a constant blanket of nitrogen at a pressure of 30 psig. After the oil, the catalyst, and the nitrogen had been in mutual contact for about 10 minutes, 1-hexene was pumped into the reactor at 1.35 pounds per minute for 75 minutes. The mixture was stirred at the same temperature and nitrogen pressure for an additional hour. A total of 32.8 pounds of 1-hexene was lost from the reactor through a pressure relief valve due to pressure buildup from too slow polymerization. There remained a liquid phase in the reactor containing unreacted 1-hexene and a separate phase containing a poly(1-hexene) that was so viscous that it could not be analyzed.

EXAMPLE 4

Example 3 was repeated. No polymerization of 1-hexene was obtained while 39.5 pounds of 1-hexene were lost from the reactor through the pressure relief valve.

EXAMPLE 5

Example 3 was repeated. Only seven pounds of 1-hexene were lost from the reactor. There was a yield of 89 percent poly(1-hexene) exclusive of 1-hexene lost from the reactor having an $M_w$ of 1,030,000, an $M_n$ of 61,382 and a distribution factor of 16.8. These molecular weight characteristics placed this polymer far outside the limits which have been found to be necessary for preparing multiviscosity graded motor oils.

EXAMPLE 6

A high molecular weight poly(1-hexene) was made in a 30 gallon stirred reactor. While a hydrogen blanket was maintained in the reactor, 65.8 pounds of the light neutral oil, one pound of a six weight percent solution of triethyl aluminum in a 22 to 28 carbon alpha-olefin wax and 25.2 grams of $(TiCl_3)_3 \cdot AlCl_3$ were added to the reactor. After the reactor was heated to 240° F. under a constant blanket of hydrogen at a pressure of 25 psig. for 30 minutes, it was purged with nitrogen for 15 minutes to remove the excess hydrogen. Then the reactor was pressurized to 30 psig. with nitrogen at 240° F., while 1-hexene was pumped into the reactor at 1.35 pounds per minute for 75 minutes. The mixture was stirred at the same temperature and nitrogen pressure for an additional hour. The contents were removed from the reactor and quenched with 20 percent sodium hydroxide, washed, dried, and filtered. The loss of 1-hexene was 10 pounds and the yield of poly(1-hexene) was 90 percent based on 1-hexene charged at an $M_w$ of 800,000 and a molecular weight distribution of 5.2.

This example demonstrates the significant lowering of the molecular weight distribution using hydrogen instead of nitrogen in the oil conditioning.

EXAMPLE 7

A 65.2 pound quantity of the 4.1 cs. hydrotreated lubricating oil base stock was introduced into a 30 gallon reactor pressured to 30 psig. with a nitrogen-hydrogen mixture at a partial pressure of hydrogen of 4.5 psia. and was heated to 240° F. To this was added 263 grams of triethyl aluminum as a 6 percent solution in the 4.1 cs. hydrotreated lubricating oil base stock and 33 grams of $(TiCl_3)_3 \cdot AlCl_3$. The oil was conditioned for 5 minutes and then a mixture of 91 mol percent 1-hexene and nine mol percent 1-octadecene was added at a rate of 1.02 pounds per minute until 109.2 pounds were added. An average temperature of 244° F. was maintained in the reactor for a total reaction time of 3 hours. After removal of the catalyst components, the yield of the polymer was determined to be 94.1 percent and the polymer was determined to have a weight average molecular weight of 435,000 and a molecular weight distribution of 6.5. This polymer as the oil solution was added to a light neutral lubricating oil base stock having a 210° F. viscosity of 5.2 cs. in an amount sufficient to produce a resultant 3 percent polymer in oil solution. The 210° F. viscosity of this polymer modified oil was 15.25 cs. and the 0° F. viscosity by ASTM D 2602-70 was determined to be 2,000 which was an SAE 10W-40 grade motor oil.

EXAMPLE 8

Example 7 was repeated in all respects except that the hydrotreated lubricating oil base stock was not conditioned prior to the alpha-olefin polymerization and the reactor temperature was maintained at an average of 237° F. during the polymerization. The yield of polymer was only 32.4 percent. It was found to have a weight average molecular weight of 1,100,000 and a molecular weight distribution of 14. When added to the 5.2 cs. light neutral lubricating oil base stock to form a three percent polymer in oil solution, the 210° F. viscosity of the polymer modified motor oil was 8.30, a SAE 20 grade oil, but the polymer modified oil was so viscous at 0° F. that it failed in the ASTM D 2602-70 viscosity test.

EXAMPLES 9-22

The procedures and conditions of both the lube oil conditioning treatment and the polymerization reaction of Example 7 were repeated many times in order to evaluate the reproducibility of the polymerization reaction in preparing alpha-olefin polymers of substantially consistent molecular weight characteristics using a hydrotreated lubricating oil base stock which has been conditioned by hydrogen treatment in the presence of a Ziegler-Natta catalyst in accordance with this invention. These polymers were added to a light neutral lubricating oil base stock having a 210° F. viscosity of 5.2 cs. as in Example 7. The results of these experiments are set out in Table I.

Table I

| | Polymer | | Polymer Modified Oil | |
|---|---|---|---|---|
| Ex. | $M_w \times 10^{-3}$ | $M_w/M_n$ | Polymer,% | 210°F. vis.,cs. |
| 9 | 398 | 9.3 | 2.64 | 15.65 |
| 10 | 291 | 8.8 | 2.76 | 15.80 |
| 11 | 303 | 6.1 | 2.89 | 14.95 |
| 12 | 409 | 9.8 | 2.60 | 15.65 |
| 13 | 351 | 6.3 | 2.90 | 15.70 |
| 14 | 474 | 9.0 | 2.78 | 15.90 |
| 15 | 264 | 6.5 | 2.88 | 14.65 |
| 16 | 362 | 6.7 | 2.82 | 16.00 |
| 17 | 421 | 8.2 | 2.77 | 15.45 |
| 18 | 340 | 8.1 | 2.76 | 14.75 |
| 19 | 362 | 8.7 | 2.84 | 15.95 |
| 20 | 370 | 7.4 | 2.70 | 15.55 |
| 21 | 400 | 7.5 | 2.25 | 15.35 |
| 22 | 376 | 7.7 | 2.74 | 15.45 |
| Average | 364 | 7.9 | 2.74 | 15.55 |

EXAMPLES 23-26

The procedures of Example 7 were repeated except that the polymer composition and the hydrogen partial pressure in the polymerization step was varied. The results of these experiments are set out in Table II:

Table II

| Polymerization | 23 | 24 | 25 | 26 |
|---|---|---|---|---|
| Olefin | | | | |
| $C_6$, mol % | 86.9 | 85 | 100 | 100 |
| $C_{18}$, mole % | 13.1 | 15 | 0 | 0 |
| conversion | 88.9 | 90.9 | 94.4 | 90.5 |
| $H_2$, psia. | 45 | 45 | 9 | 4.5 |
| Polymer | | | | |
| $M_w \times 10^{-3}$ | 92 | 102 | 215 | 292 |
| $M_w/M_n$ | 6.2 | 6.4 | 5.4 | 5.3 |

EXAMPLE 27

A high molecular weight poly(1-hexene) was made in a 30-gallon stirred reactor. While a hydrogen blanket was maintained in the reactor, 65 pounds of light neutral oil, one pound of a 6 weight percent solution of triethyl aluminum in a 22 to 28 carbon alpha-olefin wax and 0.05 pound of $(TiCl_3)_3 \cdot AlCl_3$ were added to the reactor. The reactor was heated to 240° F. under a constant blanket of hydrogen at a pressure of 19 psig. After the oil had been conditioned by contact with the catalyst and the hydrogen for about ten minutes, 1-hexene was pumped into the reactor at a rate of 1.35 pounds per minute for 75 minutes. The mixture was stirred at the same temperature and hydrogen pressure for an additional hour. The contents were removed from the reactor and quenched with 20 percent sodium hydroxide, washed, dried and filtered. Two pounds of 1-hexene were lost. The poly(1-hexene) was recovered in 94 percent yield and had a weight average molecular weight, $M_w$, of 220,000, a number average molecular weight, $M_n$, of 48,000, and a molecular weight distribution, $M_w/M_n$, of 4.6.

EXAMPLE 28

A high molecular weight poly(1-hexene) was made in a 30 gallon stirred reactor. While a hydrogen blanket was maintained in the reactor, 65 pounds of light neutral oil, 0.58 pound of triethyl aluminum and 0.61 pound of $(TiCl_3)_3 \cdot AlCl_3$ were added to the reactor. The reactor was heated to 240° F. under a constant blanket of hydrogen at a pressure of 25 psig. After the oil had been conditioned by contact with the catalyst and the hydrogen for about 10 minutes, 1-hexene was pumped into the reactor at 1.35 pounds per minute for 75 minutes. The mixture was stirred at the same temperature and hydrogen pressure for an additional hour. The contents were removed from the reactor and quenched with 20 percent sodium hydroxide, washed, dried, and filtered. The yield of poly(1-hexene) was 93 percent based on 1-hexene charged to the reactor with no loss of 1-hexene. The product $M_w$ was 76,000, the $M_n$ was 15,600, and the molecular weight distribution was 4.9.

EXAMPLE 29

In this example the oil contained about 200 ppm. of dissolved oxygen and about 100 ppm. of water when it was introduced into the 30-gallon stirred reactor. While a hydrogen blanket was maintained in the reactor, 65 pounds of the light neutral oil, one pound of a six weight percent solution of triethyl aluminum in a 22 to 28 carbon alpha-olefin wax and 0.05 pound of $(TiCl_3)_3 \cdot AlCl_3$ were added to the reactor. The reactor was heated to 240° F. under a constant blanket of hydrogen at a pressure of 19 psig. After the oil had been conditioned by contact with the catalyst and the hydrogen for about ten minutes, 1-hexene was pumped into the reactor at 1.35 pounds per minute for 75 minutes. The mixture was stirred at the same temperature and hydrogen pressure for an additional hour. The contents were removed from the reactor and quenched with 20 percent sodium hydroxide, washed, dried and filtered. The yield of poly(1-hexene) was 95 percent based on 1-hexene charged to the reactor with no loss of 1-hexene. The product $M_w$ was 108,000 and its molecular weight distribution was 5.5.

The procedures described in the preceding disclosure and examples are applicable to any hydrotreated lubricating oil base stock having a 210° F. viscosity of about 2 to about 8 centistokes to condition it for use as an alpha-olefin polymerization reaction medium. The polymerization reaction being uniform and consistent is reproducible to polymers having desired molecular weight characteristics for use in the preparation of multiviscosity graded motor oils.

It is to be understood that the above disclosure is by way of specific example and that numerous modifications and variations are available to those of ordinary skill in the art without departing from the true spirit and scope of the invention.

We claim:

1. The method of conditioning a mineral oil for use as an alpha-olefin polymerization medium which comprises contacting a hydrotreated lubricating oil base stock having a 210° F. viscosity between about two cs. and about eight cs., with a Ziegler-Natta type catalyst comprising a compound of a transition metal from Groups IV-B, V-B, VI-B and VIII at a valence state less than its maximum valence state and an organometallic compound of Groups II and III metals and hydrogen at a pressure between about one and about 150 psia. at a temperature between about −10° C. and about 125° C. for about 30 seconds to about one hour, using from about 0.01 to about 20 grams of said catalyst per liter of said hydrotreated lubricating oil base stock and a ratio of gram atoms of Group II or Group III metal to gram atoms of the transition metal of from about 1:1 to about 10:1.

2. The method of conditioning a mineral oil in accordance with claim 1 in which the 210° F. viscosity of the hydrotreated lubricating oil base stock is between about 3.0 and about 6.0.

3. The method of conditioning a mineral oil in accordance with claim 1 in which the hydrogen pressure is from about 1 to about 50 psia. and the time is from about 5 to about 15 minutes.

4. The method of conditioning a mineral oil in accordance with claim 1 in which from about 0.05 to about 10 grams of catalyst is used per liter of said hydrotreated lubricating oil base stock and a ratio of gram atoms of Group II or Group III metal to gram atoms of the transition metal is from about 1.8:1 to about 3:1.

5. The method of conditioning a mineral oil in accordance with claim 1 in which the catalyst is a tri(lower)alkyl aluminum and a purple titanium trichloride.

6. The method of conditioning a mineral oil in accordance with claim 1 in which the temperature is between about 30° C. and about 125° C.

7. The method of conditioning a mineral oil for use as an alpha-olefin polymerization medium which comprises contacting a hydrotreated lubricating oil base stock having a 210° F. viscosity between about 3 cs. and about 6 cs., with a Ziegler-Natta type catalyst comprising a purple titanium trichloride and a tri(lower)alkyl aluminum compound and hydrogen at a pressure between about one and about 50 psia. at a temperature between about 30° C. and about 125° C. for about 5 minutes to about 15 minutes, using from about 0.05 to about 10 grams of said catalyst per liter of said hydrotreated lubricating oil base stock and a ratio of gram atoms of aluminum to gram atoms of titanium of from about 1.8:1 to about 3:1.

* * * * *